(12) United States Patent
Xie et al.

(10) Patent No.: US 12,327,276 B2
(45) Date of Patent: Jun. 10, 2025

(54) SYSTEM, METHOD, AND COMPUTER PROGRAM FOR IDENTIFYING ORDER-RELATED DATA ON A WEBPAGE USING MACHINE LEARNING

(71) Applicant: Rakuten Group, Inc., Tokyo (JP)

(72) Inventors: Feng Xie, Melbourne (AU); Jae Jung, Melbourne (AU); Adam Roth, Sunshine Coast (AU); Mujtaba Hussain, Melbourne (AU); James Seymour-Lock, New York, NY (US)

(73) Assignee: Rakuten Group, Inc., Tokyo (JP)

( * ) Notice: Subject to any disclaimer, the term of this patent is extended or adjusted under 35 U.S.C. 154(b) by 219 days.

(21) Appl. No.: 17/489,678

(22) Filed: Sep. 29, 2021

(65) Prior Publication Data
US 2023/0095226 A1 Mar. 30, 2023

(51) Int. Cl.
G06Q 30/00 (2023.01)
G06Q 30/0601 (2023.01)

(52) U.S. Cl.
CPC ..... *G06Q 30/0631* (2013.01); *G06Q 30/0633* (2013.01); *G06Q 30/0641* (2013.01)

(58) Field of Classification Search
CPC ........... G06Q 30/0631; G06Q 30/0633; G06Q 30/0641; G06Q 30/0601; G06Q 30/0637;
(Continued)

(56) References Cited

U.S. PATENT DOCUMENTS 8,112,317 B1 * 2/2012 Ballaro .............. G06Q 30/0631
705/26.7
10,229,436 B1 * 3/2019 Fan .................... G06Q 30/0271
(Continued)

FOREIGN PATENT DOCUMENTS

CN 201110040468 2/2011
JP 2007-140982 6/2007
(Continued)

OTHER PUBLICATIONS

Ujwal BVS, Bharat Gaind, Abhishek Kundu, Anusha Holla, Mukund Rungta, "Classification-based Adaptive Web Scraper," 2017, Samsung Research Institute, Bangalor, India, 16th IEEE International Conference on Machine Learning and Applications, 125-132 (Year: 2017).*

(Continued)

*Primary Examiner* — Marissa Thein
*Assistant Examiner* — Zachary T. Shuckrow
(74) *Attorney, Agent, or Firm* — Lessani Law Group, PC (57) ABSTRACT

The present disclosure relates to a system, method, and computer program for identifying order-related data on a webpage using machine learning. The system identifies one or more HTML blocks on a webpage for further processing, where each HTML block includes one or more HTML tags that are each associated with metadata and a value. The system converts each of the HTML tags into a vector representation. The system applies a neural network model to each of the vector representations, resulting in another vector representation, which is converted into a machine-generated label prediction for each tag, where the neural network model is trained to predict labels, including order-related labels, corresponding to HTML tags. The system identifies order-related data on the webpage from the machine-generated label predictions for the HTML tags and the corresponding tag values. The system outputs the identified order-related data.

18 Claims, 4 Drawing Sheets

(58) Field of Classification Search
CPC ........... G06Q 30/0635; G06Q 30/0643; G06Q 20/12; G06Q 20/08; G06Q 30/0207; G06N 3/08; G06N 3/0442; G06F 40/205; G06F 40/20
USPC .............................. 705/26.7, 26.8, 26.81–82
See application file for complete search history.

(56) References Cited

U.S. PATENT DOCUMENTS

| | | | |
|---|---|---|---|
| 10,311,499 B1* | 6/2019 | Kim | G06Q 30/0251 |
| 10,614,381 B2 | 4/2020 | Hoffman et al. | |
| 10,698,967 B2 | 6/2020 | Shen et al. | |
| 11,068,921 B1 | 7/2021 | Engle et al. | |
| 11,323,570 B1* | 5/2022 | Lamba | G06F 40/30 |
| 2006/0248442 A1* | 11/2006 | Rosenstein | G06F 40/177 715/255 |
| 2009/0177959 A1 | 7/2009 | Chakrabarti et al. | |
| 2010/0191594 A1* | 7/2010 | White | G06Q 40/12 705/14.27 |
| 2011/0106600 A1 | 5/2011 | Malik et al. | |
| 2011/0137717 A1* | 6/2011 | Reuthe | G06Q 30/0215 707/E17.014 |
| 2011/0153401 A1 | 6/2011 | Jellema et al. | |
| 2011/0173527 A1 | 7/2011 | Zunger | |
| 2012/0016862 A1 | 1/2012 | Rajan | |
| 2013/0014002 A1* | 1/2013 | Cai | G06F 40/103 715/234 |
| 2014/0032267 A1 | 1/2014 | Smith et al. | |
| 2014/0074584 A1 | 3/2014 | Fisher | |
| 2014/0207872 A1* | 7/2014 | Roy | G06F 16/954 709/205 |
| 2014/0278880 A1 | 9/2014 | Lemphers et al. | |
| 2015/0106181 A1 | 4/2015 | Kluth | |
| 2016/0217484 A9 | 7/2016 | Hudson et al. | |
| 2017/0185894 A1 | 6/2017 | Volkovs et al. | |
| 2017/0345075 A1 | 11/2017 | Khandelwal et al. | |
| 2018/0293499 A1* | 10/2018 | He | G06F 40/30 |
| 2018/0315069 A1 | 11/2018 | Kamireddy et al. | |
| 2018/0336279 A1* | 11/2018 | Ahern | G06F 16/9538 |
| 2019/0385185 A1 | 12/2019 | Shiffert et al. | |
| 2020/0084023 A1* | 3/2020 | Bessonov | H04L 63/0421 |
| 2020/0134698 A1 | 4/2020 | Dabral et al. | |
| 2020/0159647 A1 | 5/2020 | Puszkiewicz et al. | |
| 2020/0160050 A1* | 5/2020 | Bhotika | G06V 30/414 |
| 2020/0210511 A1* | 7/2020 | Korobov | G06F 18/256 |
| 2020/0320163 A1* | 10/2020 | Raiskin | G06F 40/14 |
| 2020/0357012 A1* | 11/2020 | Kendall | G06Q 20/3433 |
| 2021/0044870 A1* | 2/2021 | Li | H04N 21/252 |
| 2021/0073846 A1 | 3/2021 | Hudson | |
| 2021/0089710 A1 | 3/2021 | Chernov et al. | |
| 2021/0103975 A1 | 4/2021 | Walters et al. | |
| 2021/0125262 A1 | 4/2021 | Corrieri et al. | |
| 2021/0182892 A1 | 6/2021 | Henderson et al. | |
| 2021/0191990 A1 | 6/2021 | Shi et al. | |
| 2021/0312519 A1* | 10/2021 | Sharshevsky | G06N 3/08 |
| 2022/0222735 A1 | 7/2022 | Senthil | |
| 2022/0318791 A1 | 10/2022 | Ballenger et al. | |

FOREIGN PATENT DOCUMENTS

| | | | |
|---|---|---|---|
| JP | 2021018601 | 2/2021 | |
| WO | WO-2016177646 A1 * | 11/2016 | G06F 16/951 |
| WO | 2020055615 | 3/2020 | |
| WO | 2020061064 | 3/2020 | |
| WO | WO-2020061064 A1 * | 3/2020 | G06Q 30/0207 |

OTHER PUBLICATIONS

Anonymous: "Automatic Extraction and Provision of Coupon Codes for Online Shopping", IP.com, Jan. 16, 2019, pp. 1-6.
Zhang et al., "Large-Scale Multimodal Hashing with Semantic Correlation Maximization", Association for the Advancement of Artificial Intelligence, 2014, pp. 1-7.
Bronstein et al., "Data Fusion through Cross-modality Metric Learning using Similarity-Sensitive Hashing", 2010, pp. 1-8.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Correlation Hashing Network for Efficient Cross-Modal Retrieval", 2016, pp. 1-12.
Cheng et al., "Wide & Deep Learning for Recommender Systems", DLRS '16, Sep. 15, 2016, pp. 1-4.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He et al., "Neural Collaborative Filtering", WWW 2017, Apr. 3-7, 2017, pp. 1-10.
He, et al., "Neural Collaborative Filtering" Proceedings of the 26th International Conference on World Wide Web (WWW'17) [online], Apr. 3, 2017, pp. 173-182.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
Javkar et al., "Best Offer Recommendation Service", 2016 International Conference on Advances in Computing, Communications and Informatics, pp. 2430-2436.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWWW '19, May 13-17, 2019, pp. 1-7.
Long et al., "Composite Correlation Quantization for Efficient Multimodal Retrieval", SIGIR '16, Jul. 17-21, 2016, pp. 1-11.
Ricci et al., "Recommender Systems Handbook", 2011.
Sedhain et al, "AutoRec: Autoencoders Meet Collaborative Filtering", WWWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Takacs et al., "Matrix Factorization and Neighbor Based Algorithms for the Netflix Prize Problem", RecSys 2008, Oct. 23-25, 2008, pp. 267-274.

(56) References Cited

OTHER PUBLICATIONS

Ujwal et al., "Classification-based Adaptive Web Scraper", 16th IEEE International Conference on Machine Learning and Applications, 2017, pp. 125-132.

Wang et al., "Collaborative Deep Learning for Recommender Systems", KDD '15, Aug. 10-13, 2015, pp. 1235-1244.

Watfa et al., "Method and System for Providing an Enhanced Online Shopping Experience to Users Through a Web Browser Extension/Mobile App", Mar. 30, 2021, pp. 1-5.

Wang et al., "Effective Multi-Modal Retrieval based on Stacked Auto-Encoders", Proceedings of the VLDB Endowment, Sep. 1-5, 2014, pp. 649-660.

Wang, Huiwei et al., "ML2E: Meta-Learning Embedding Ensemble for Cold-Start Recommendation", IEEE Access, Sep. 2020, pp. 165757-165768.

Wu et al., "Quantized Correlation Hashing for Fast Cross-Modal Search", Proceedings of the Twenty-Fourth International Joint Conference on Artificial Intelligence, 2015, pp. 3946-3952.

Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.

Xue et al., "Deep Matrix Factorization Models for Recommender Systems", Proceedings of the Twenty-Sixth International Joint Conference on Artificial Intelligence, 2017, pp. 3203-3209.

Yang et al., "Shared Predictive Cross-Modal Deep Quantization", IEEE Transaction on Neural Networks and Learning Systems, 2019, pp. 1-12.

Zhang et al., "AutoSVD++: An Efficient Hybrid Collaborative Filtering Model via Contractive Auto-encoders", SIGIR '17, Aug. 7-11, 2017, pp. 957-960.

Zhang et al., "Collaborative Quantization for Cross-Modal Similarity Search", 2019, pp. 1-10.

Shota, Tamamura et al., "An automated testing method for input forms of Web applications", 2021 Information Processing Society of Japan, 8 pages.

\* cited by examiner

USING MACHINE-LEARNING PREDICTIONS TO CALCULATE AN ESTIMATED USER REWARD

Client application identifies a webpage that may have a total purchase amount (e.g., a potential order confirmation page or a checkout page with a shopping cart).
310

↓

Client application sends HTML blocks from the webpage to the machine-learning (ML) module.
320

↓

ML module creates a vector representation for each of the HTML tags in the HTML blocks.
330

↓

ML module applies a neural network model to each of the tag vector representations to obtain a machine-generated label prediction for each of the HTML tags in the HTML blocks.
340

↓

ML module uses the machine-generated label predictions to determine if the webpage includes a total purchase amount.
350

↓

If a total purchase amount is identified, the ML module provides the total purchase amount to the client application.
360

↓

Client application calculates a reward amount as a function of the total purchase amount (e.g., a cashback reward or a points reward).
370

↓

Client application displays estimated reward in a user interface in substantially real time.
380

SYSTEM, METHOD, AND COMPUTER PROGRAM FOR IDENTIFYING ORDER-RELATED DATA ON A WEBPAGE USING MACHINE LEARNING

BACKGROUND OF THE INVENTION

1. Field of the Invention

This invention relates generally to website management and, more specifically to, a system and method for identifying order-related data on a webpage using machine learning.

2. Description of the Background Art

It is desirable to understand order-related data on a webpage. There are a number of uses for such data. For example, shopping portals that provide rewards or points to a user based on the amount they purchase may use order-related data to provide real-time reward estimates to the user. A shopping portal may also want to understand checkout cart data for purposes of identifying fields for autofill, such as coupon code fields. Order-related data may also be used for analytics and reporting. For example, it may be useful to better understand when products are abandoned in shopping carts.

A rules-based approach that relies on regular expressions is often used to identify order-related data on webpages. However, for shopping portals and other systems that have to identify order-related data on many different merchant webpages, this can be cumbersome and difficult to scale. E-commerce websites and checkout pages change frequently, and each merchant's website is different. A rules-based approach often requires customization for each merchant website, and then each merchant website must be monitored for changes. Therefore, there is a need for a better, more scalable approach to identifying order-related data on a wide variety of merchant websites. More specifically, there is a need for a machine-learning approach to identifying order-related data on merchant websites.

SUMMARY OF THE DISCLOSURE

The present disclosure describes a system, method, and computer program for identifying order-related data on a webpage using machine learning. The method is performed by a computer system that includes servers, storage systems, networks, operating systems, and databases.

The present invention uses machine learning to identify order-related data, such as shopping cart data and order confirmation data. The invention may be used to determine what a user purchased, or what a user abandoned in a shopping cart (i.e., placed in a cart but did not purchase). Traditional methods use rules and regular expressions (i.e., text pattern matching) to identify checkout pages and order confirmation pages. This, however, usually needs to be customized for each merchant and often fails if the merchant changes the layout of the checkout, shopping cart, or order confirmation pages. Also, while it may be feasible to customize according to the traditional method for a few hundred merchants, it would be very difficult to scale to thousands or tens of thousands of merchants. In addition, such a machine-learning method that identifies order confirmation pages and extracts order-related data may be used to improve the user experience by providing estimated cashback information to customers in substantially real time after a purchase.

In one embodiment, a method for identifying order-related data on a webpage using machine learning comprises the following steps:
  identifying one or more HTML blocks on a webpage for further processing, wherein each HTML block includes one or more HTML tags that are each associated with metadata and a value;
  creating a vector representation for each of the HTML tags;
  applying a neural network model to each of the HTML tags to obtain a label prediction for each tag, wherein the neural network model is trained to predict labels, including order-related labels, corresponding to HTML tags;
  identifying order-related data on the webpage from the machine-generated label predictions for the HTML tags and the corresponding tag values; and
  outputting the identified order-related data.

DETAILED DESCRIPTION OF THE PREFERRED EMBODIMENTS

The present disclosure describes a system, method, and computer program for identifying order-related data on a webpage using machine learning. The method is performed by a computer system that includes servers, storage systems, networks, operating systems, and databases ("the system"). The computer system may be one user computing device (e.g., a user's mobile phone or tablet) or client and service computing devices working together.

In contrast to traditional methods, which use rules and regular expressions (i.e., text pattern matching) to identify checkout pages and order confirmation pages, the present invention uses a machine-learning approach, which has the benefits of being able to scale way beyond a few hundred merchants, is robust despite frequent changes to merchant websites, and can be used for a number of applications including providing estimated cashback information to customers in substantially real time after a purchase.

Example implementations of the methods are described in more detail with respect to FIGS. 1-4.

Figure 1:
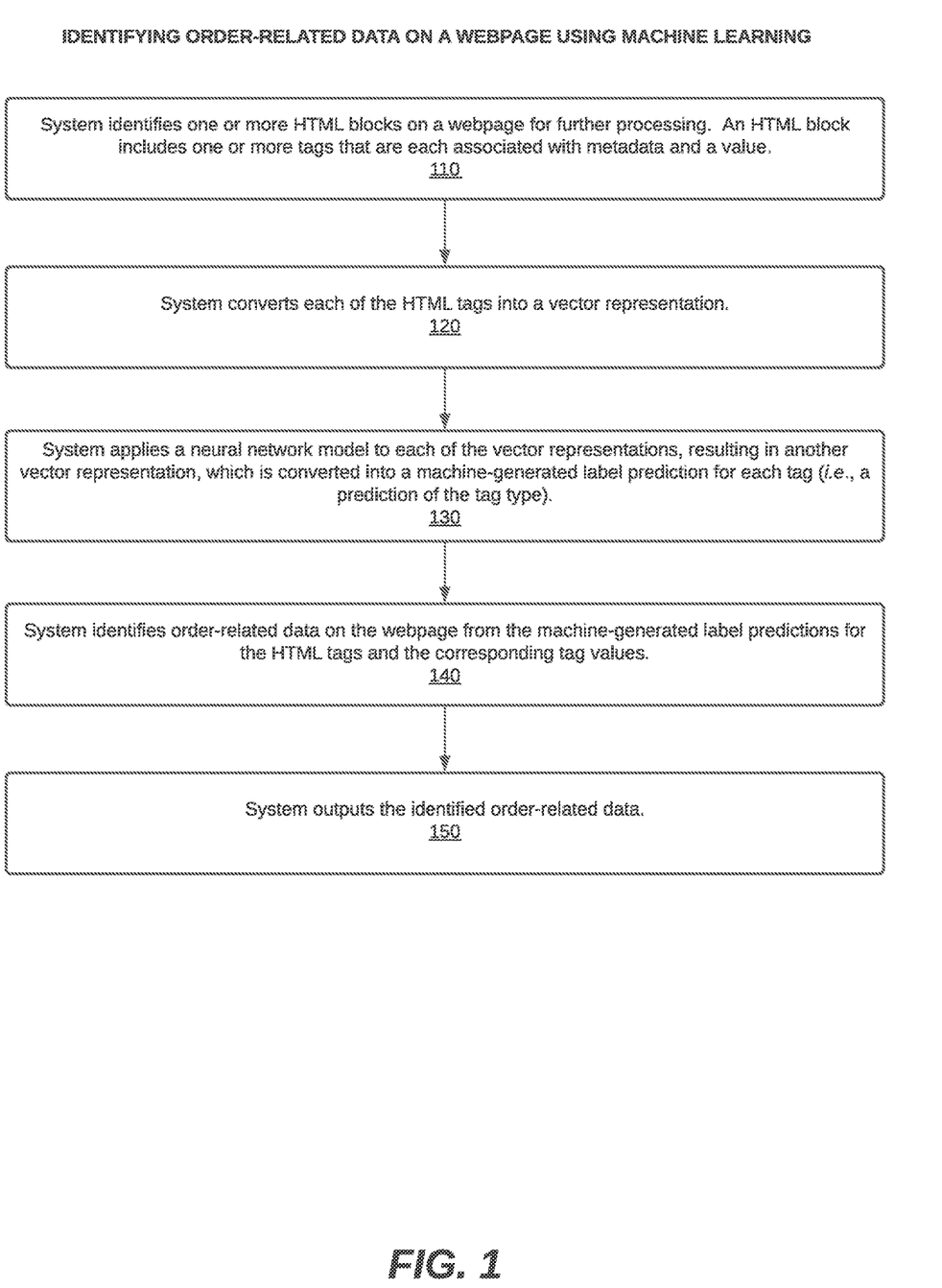
FIG. 1 is a flowchart that illustrates a method, according to one embodiment, for identifying order-related data on a webpage using machine learning.

1. Method for Identifying Order-Related Data on a Webpage Using Machine Learning FIG. 1 illustrates a method for identifying order-related data on a webpage using machine learning. As used herein, a webpage includes web content in a mobile application or mobile browser as well as a webpage displayed in a web browser. The system identifies one or more HTML blocks on a webpage for further processing (step 110). An HTML block includes one or more HTML tags that are each associated with metadata (e.g., tag ID, tag name, tag class, tag type, inner text for the tag, etc.) and a value. An HTML block preserves the original HTML structure including parent-child and sibling relationships. An HTML block is typically grouped based on related HTML tags. For example, for a webpage with a shopping cart, there may be an HTML block with all the tags associated with the shopping cart. In certain embodiments, if a field is blank, the value may be null.

Identifying one or more HTML blocks on a webpage for further processing involves making a preliminary determination as to whether the webpage has order-related info (e.g., determining whether the webpage is a checkout page with a shopping cart, or an order confirmation page). In one embodiment, making a preliminary determination includes a cart scraper detecting that it is on a checkout page by using both the URL and the elements on the webpage to see if either one matches a keyword from a defined list. For example, if the URL contains the keyword "cart" or "checkout," the system determines that the webpage is a checkout page. If an element on the webpage has the keyword "checkout" or "total-price," the system will likewise determine that the webpage is a checkout page. Along with this positive keyword identification, the system also uses a list of negative keywords (e.g., homepage). If either the URL or an element on the webpage contains a negative keyword, then the system determines that the webpage is not a checkout page (even if there was a positive keyword identification).

The system converts each of the HTML tags into a vector representation (step 120). The system applies a neural network model to each of the vector representations, resulting in another vector representation, which is converted into a machine-generated label prediction for each tag (i.e., a prediction of the tag type) (step 130). In certain embodiments, the neural network model is a bi-directional long short-term memory (i.e., bi-directional LSTM) neural network. The neural network model is trained to predict labels, including order-related labels, corresponding to HTML tags. Examples of order-related labels include: product name, product URL, product image, quantity, item price, subtotal price, shipping cost, tax, total price, etc. The system identifies order-related data on the webpage from the machine-generated label predictions for the HTML tags and the corresponding tag values (step 140). The system outputs the identified order-related data (step 150), which it uses for a number of applications.

In certain embodiments, identifying order-related data comprises identifying a shopping cart on the webpage using the machine-generated label predictions. As used herein, a shopping cart includes a checkout cart used in the checkout process. In certain embodiments, identifying a shopping cart includes determining whether the machine-generated label predictions for the HTML tags on the webpage satisfy shopping cart qualifications, and, in response to determining that the machine-generated label predictions for the HTML tags on the webpage satisfy shopping cart qualifications, concluding that the webpage includes a shopping cart. Examples of shopping cart qualifications that must be satisfied include predicted labels having: (1) at least one product name, product URL, or image, (2) a quantity, and (3) a total price. As in the case with the preliminary determination as to whether the webpage has order-related info, the shopping cart qualifications may also specify predicted labels that cannot appear in order to conclude that the webpage includes a shopping cart. In an alternate embodiment, the predicted labels may be inputted into a second neural network, which is trained to classify shopping carts and/or order confirmation pages based on the label predictions.

In certain embodiments, identifying the order-related data includes using the machine-generated label predictions to identify a cart subtotal, a cart total, and one or more line item(s), and, for each line item, a line total, a product URL, and an image URL. In certain embodiments, identifying order-related data further includes identifying products abandoned in a shopping cart.

In certain embodiments, the order-related data is outputted in the form of key-value pairs including: (1) the machine-generated label predictions for the HTML, tags, and (2) the values associated with the HTML tags. Each key is a predicted label, and each corresponding value is the value of the HTML tag for which the label was predicted. In certain embodiments, the key-value pairs are sent to a client application, which uses the key-value pairs to calculate a reward for a user.

In certain embodiments, the outputted order-related data is sent to a recommendation system, which uses the identified order-related data to recommend other products to the user. In certain embodiments, the method further includes determining from the machine-generated label predictions that the webpage is an order confirmation page.

In certain embodiments, identifying order-related information includes identifying a total purchase amount. In certain embodiments, the total purchase amount is the cost of the good or service purchased excluding tax and shipping. In other embodiments, the total purchase amount may include tax and shipping. In certain embodiments, the method further includes using the identified total purchase amount to provide an estimated reward to a user, where the estimated reward is a function of the total purchase amount. In certain embodiments, the estimated reward is an estimated cashback reward. In certain embodiments, the estimated reward is an estimated points award. In certain embodiments, the total purchase amount is identified in substantially real time and the estimated reward is provided to the user in substantially real time.

In certain embodiments, converting each of the HTML tags into a vector representation includes concatenating metadata and inner text of the HTML tag to form a string with a plurality of words. For each word in the string, the system retrieves a word embedding (i.e., a vector of numeric values of fixed length) in a pretrained word2vec model. The system then creates a sentence embedding from the word embeddings. In certain embodiments, the sentence embedding is created by averaging the word embeddings. The sentence embedding is the vector representation for the tag.

2. An Example Embodiment

Figure 2:
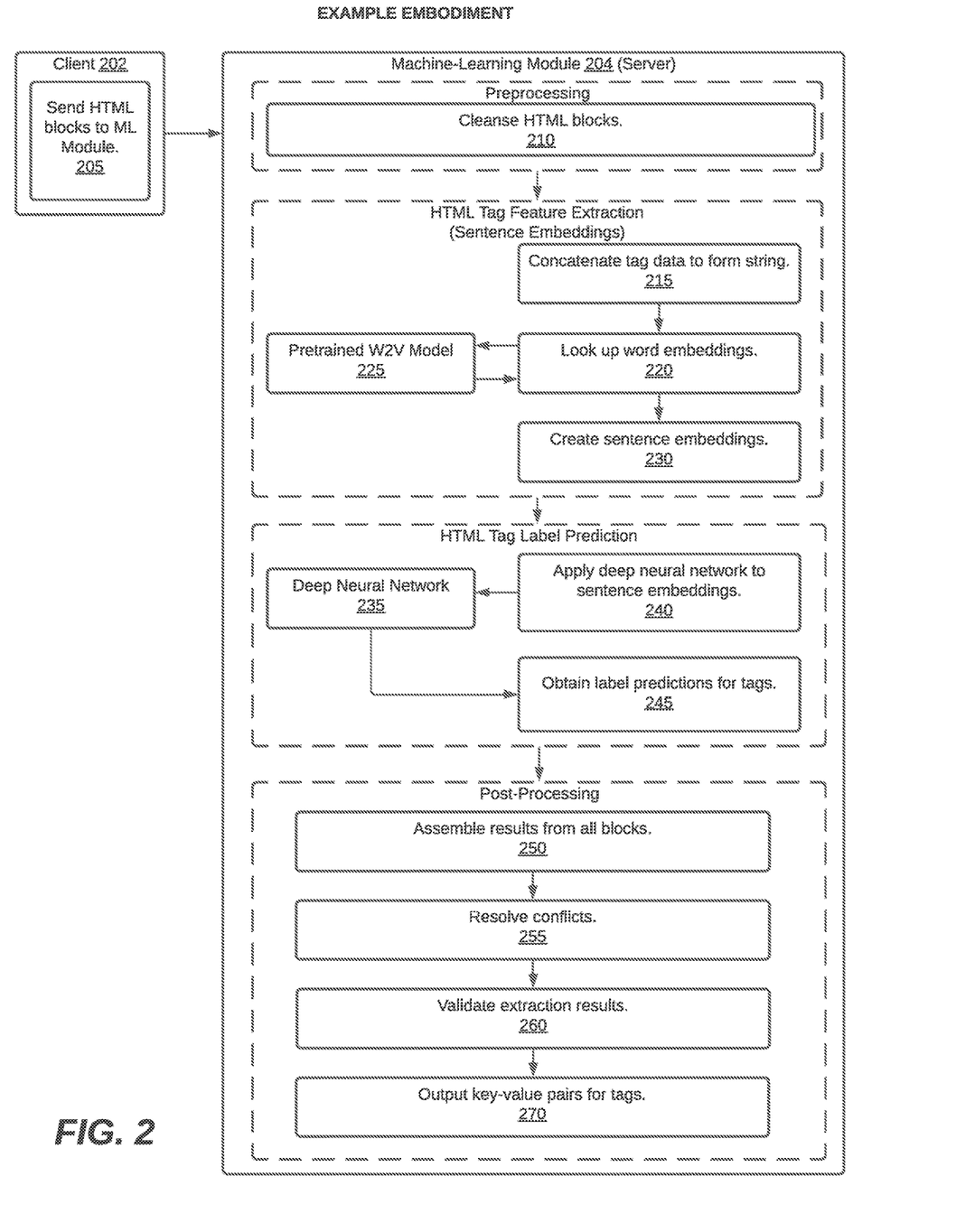
FIG. 2 is a flowchart that illustrates an example embodiment of the method illustrated in FIG. 1.

FIG. 2 illustrates an example embodiment of the method illustrated in FIG. 1, which includes a client application 202 and a machine-learning (ML) module 204 hosted on a server. The client application 202 sends HTML blocks to the ML module 204 (step 205). In certain embodiments, the client application 202 sends the HTML blocks to an API for the ML module 204. In certain embodiments, the ML module 204 accepts scraping requests in JSON format along with the HTML blocks, where the scraping request includes information related to the request ID, user ID that identifies the mobile device, URL information, and timestamp.

The ML module 204 processes the HTML blocks in four stages: preprocessing, HTML tag feature extraction (sentence embeddings), HTML tag label prediction, and post-processing. In the preprocessing stage, the ML module 204 cleanses the HTML blocks (i.e., removes the accents and lowercase letters) (step 210). In the HTML tag feature extraction stage, the ML module 204 concatenates tag data to form a string (step 215), looks up its word embeddings (step 220) in a pretrained word2vec model 225, and uses the word embeddings to create sentence embeddings (step 230).

In the HTML tag label prediction stage, the ML module 204 applies a deep neural network 235 to the sentence embeddings (step 240) and obtains label predictions for the tags (step 245). In certain embodiments, the label predictions for the tags are outputted with a confidence score. In the post-processing stage, the ML module 204 assembles the results from all blocks (step 250), resolves any conflicts within and across HTML blocks (step 255), validates extraction results (step 260), and outputs key-value pairs for the tags (step 270).

As one example of resolving a conflict with respect to a checkout cart page, there should be a one-to-one correspondence for product names and line totals. If there are two product name labels and three line-total labels, the system may resolve this conflict by keeping only the two line-totals with the higher confidence scores. As one example of validating extraction results, the system determines whether the product price is a sensible numeric value and whether the sum of the line totals equals the sub-total amount. In certain embodiments, the key-value pair will be flagged to indicate whether the extraction passed a quality review. In certain embodiments, the extraction results are stored in a database and sent back to the client application as needed.

Figure 3:
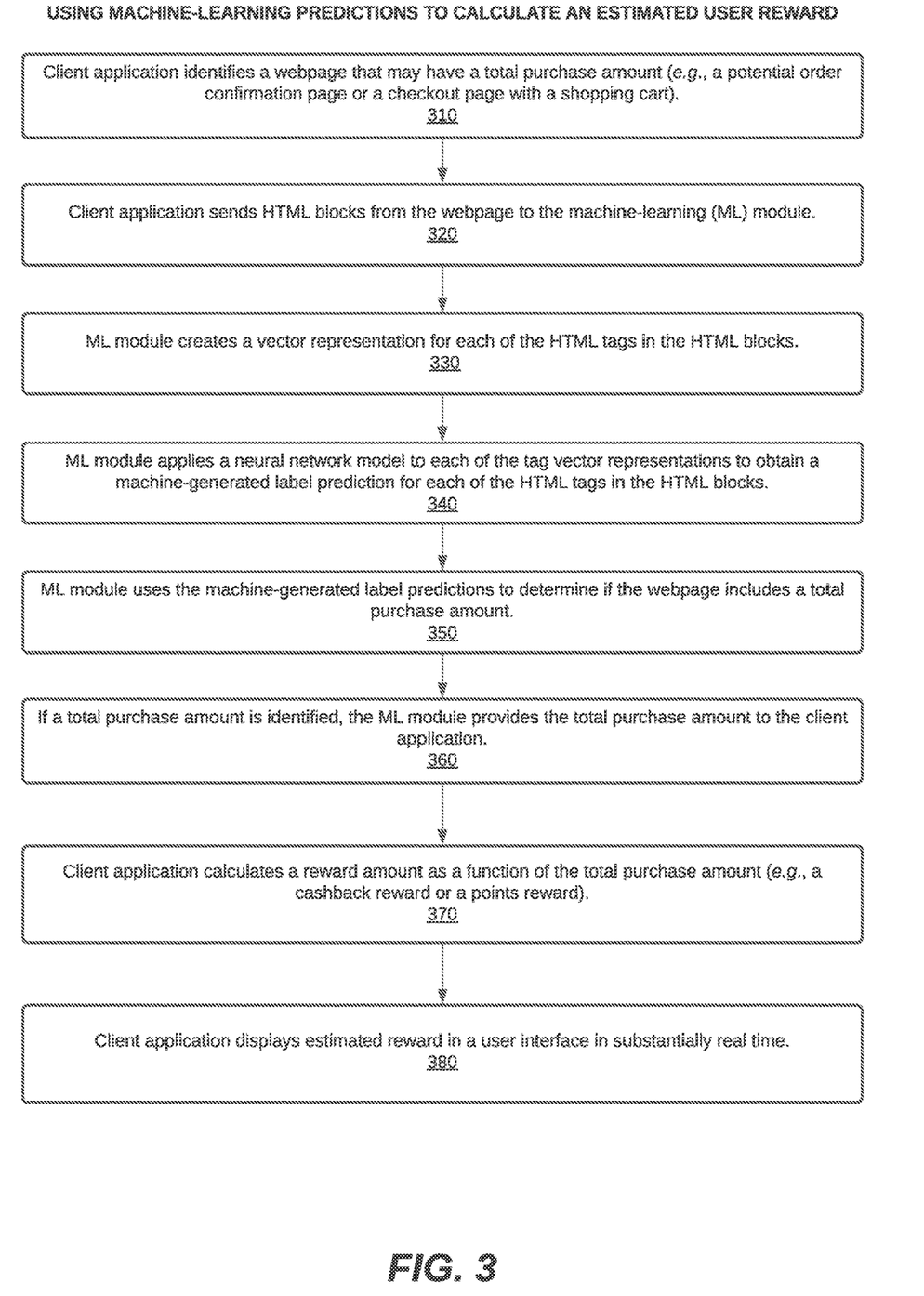
FIG. 3 is a flowchart that illustrates a method, according to one embodiment, for using machine-learning predictions to calculate an estimated user reward.

3. Method for Using Machine-Learning Predictions to Calculate an Estimated User Reward FIG. 3 illustrates a method for using machine-learning predictions to calculate an estimated user reward. The client application identifies a webpage that may have a total purchase amount (e.g., a potential order confirmation page or a checkout page with a shopping cart) (step 310). The client application sends HTML blocks, which include HTML tags, from the webpage to the machine-learning (ML) module (step 320). The ML module creates a vector representation for each of the HTML tags in the HTML blocks (step 330). The ML module applies a neural network model to each of the tag vector representations to obtain a machine-generated label prediction for each of the HTML tags in the HTML blocks (step 340). The ML module uses the machine-generated label predictions to determine if the webpage includes a total purchase amount (step 350). If a total purchase amount is identified, the ML module provides the total purchase amount to the client application (step 360). The client application calculates a reward amount as a function of the total purchase amount (e.g., a cashback reward or a points reward) (step 370). The client application displays the estimated reward in a user interface in substantially real time (step 380).

4. Example System Architecture

Figure 4:
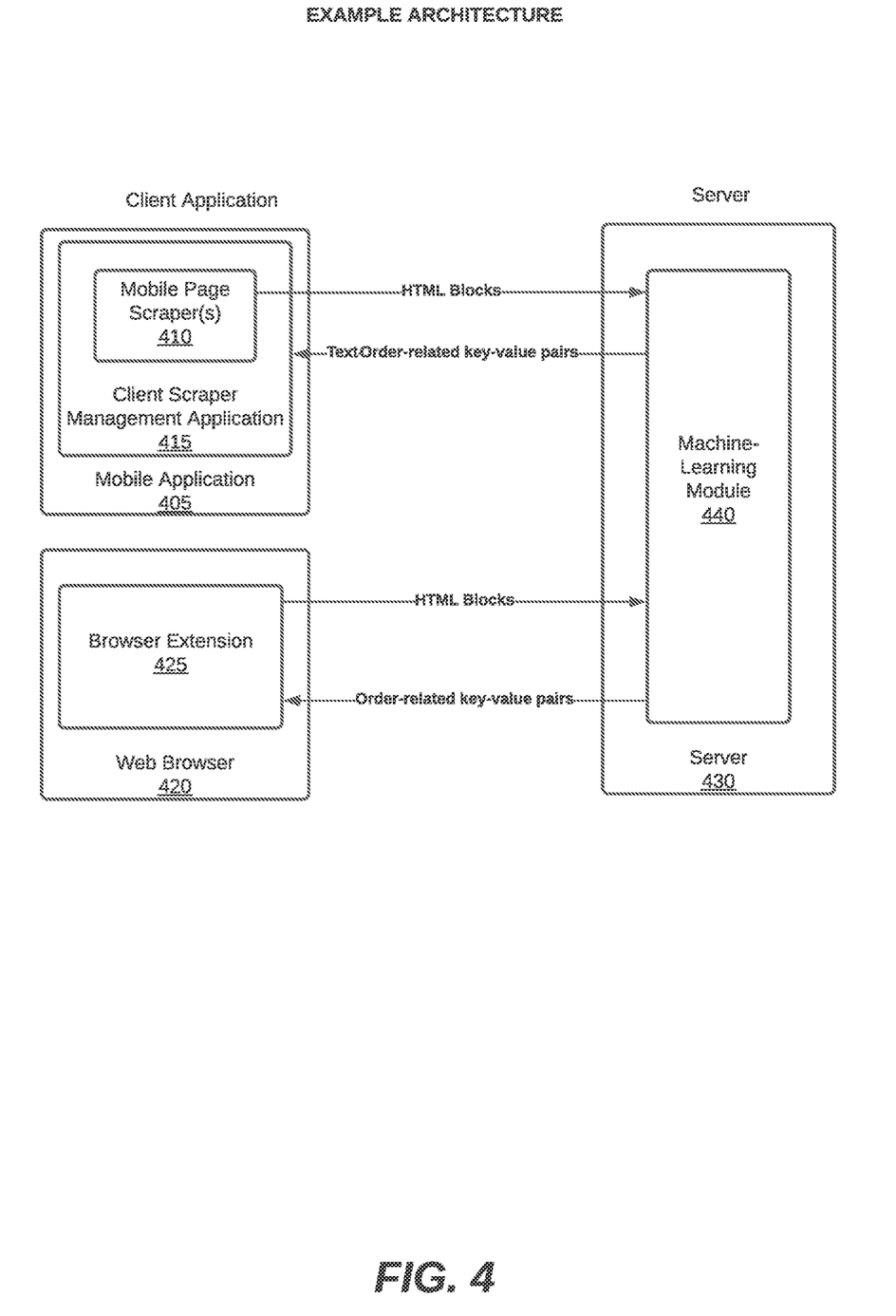
FIG. 4 is a block diagram that illustrates an example software architecture according to one embodiment.

FIG. 4 illustrates an example architecture for a system that performs the methods described herein. However, the methods described herein may be implemented in other systems and are not limited to the illustrated system. The system includes a client application and a server 430. The client application may take the form of a mobile application 405 on a mobile device or a web browser 420 on a desktop. In the case of a mobile application 405, one or more mobile page scraper(s) 410 send(s) HTML blocks to the machine-learning (ML) module 440 on the server 430. The ML module 440 sends text-order-related key-value pairs back to the client scraper management application 415 in the mobile application 405. In the case of the web browser 420, a browser extension 425 sends HTML blocks to the ML module 440. The ML module 440 sends order-related key-value pairs back to the browser extension 425 in the web browser 420.

5. General

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for identifying order-related data on a webpage using machine learning, the method comprising:
   identifying one or more HTML blocks on a webpage for further processing, wherein each HTML block preserves an original HTML structure including parent-child and sibling relationships and includes one or more HTML tags that are each associated with metadata and a value, wherein, for each HTML tag, the metadata comprises a tag ID, tag name, tag class, tag type, and inner text for the HTML tag, and the value is a value that corresponds to the HTML tag;
   converting each of the HTML tags into a vector representation, wherein converting each of the HTML tags into a vector representation comprises:
      concatenating the metadata and the inner text of the HTML tag to form a string with a plurality of words,
      for each word in the string, retrieving a word embedding in a pretrained word2vec model, and
      creating a sentence embedding from the word embeddings;
   applying a deep neural network model to each of the vector representations, resulting in another vector representation, which is converted into a machine-generated label prediction for each tag, wherein the deep neural network model is a bi-directional long short-term memory neural network that is trained to predict labels, including order-related labels, corresponding to HTML tags, and wherein the machine-generated label prediction for each tag is outputted with a confidence score;
   inputting the machine-generated label predictions into a second neural network, wherein the second neural network is trained to classify shopping carts and/or order confirmation pages based on the machine-generated label predictions;
   identifying order-related data on the webpage from the machine-generated label predictions for the HTML tags and the corresponding tag values; and
   outputting the identified order-related data, wherein the order-related data is outputted in the form of key-value pairs comprising: (1) the machine-generated label predictions for the HTML tags, and (2) the values associated with the HTML tags.

2. The method of claim 1, wherein identifying the order-related data comprises identifying a shopping cart on the webpage using the machine-generated label predictions.

3. The method of claim 2, wherein identifying a shopping cart comprises:
   determining whether the machine-generated label predictions for the HTML tags on the webpage satisfy shopping cart qualifications; and in response to determining that the machine-generated label predictions for the HTML tags on the webpage satisfy shopping cart qualifications, concluding that the webpage includes a shopping cart.

4. The method of claim 2, wherein identifying the order-related data comprises using the machine-generated label predictions to identify a cart subtotal, a cart total, and one or more line item(s), and, for each line item, a line total, a product URL, and an image URL.

5. The method of claim 2, wherein identifying the order-related data further comprises identifying products abandoned in a shopping cart.

6. The method of claim 1, wherein the key-value pairs are sent to a client application, which uses the key-value pairs to calculate a reward for a user.

7. The method of claim 1, wherein the outputted order-related data is sent to a recommendation system, which uses the identified order-related data to recommend other products to the user.

8. The method of claim 1, further comprising determining from the machine-generated label predictions that the webpage is an order confirmation page.

9. The method of claim 1, wherein identifying the order-related data comprises identifying a total purchase amount.

10. The method of claim 9, further comprising using the identified total purchase amount to provide an estimated reward to a user, wherein the estimated reward is a function of the total purchase amount.

11. The method of claim 10, wherein the estimated reward is an estimated cashback reward.

12. The method of claim 10, wherein the estimated reward is an estimated points award.

13. The method of claim 10, wherein the total purchase amount is identified in substantially real time and the estimated reward is provided to the user in substantially real time.

14. The method of claim 1, wherein the sentence embedding is created by averaging the word embeddings.

15. A non-transitory computer-readable medium comprising a computer program that, when executed by a computer system, enables the computer system to perform the following steps for identifying order-related data on a webpage using machine learning, the steps comprising:
identifying one or more HTML blocks on a webpage for further processing, wherein each HTML block preserves an original HTML structure including parent-child and sibling relationships and includes one or more HTML tags that are each associated with metadata and a value, wherein, for each HTML tag, the metadata comprises a tag ID, tag name, tag class, tag type, and inner text for the HTML tag, and the value is a value that corresponds to the HTML tag;
converting each of the HTML tags into a vector representation, wherein converting each of the HTML tags into a vector representation comprises:
concatenating the metadata and the inner text of the HTML tag to form a string with a plurality of words,
for each word in the string, retrieving a word embedding in a pretrained word2vec model, and
creating a sentence embedding from the word embeddings;
applying a deep neural network model to each of the vector representations, resulting in another vector representation, which is converted into a machine-generated label prediction for each tag, wherein the deep neural network model is a bi-directional long short-term memory neural network that is trained to predict labels, including order-related labels, corresponding to HTML tags, and wherein the machine-generated label prediction for each tag is outputted with a confidence score;
inputting the machine-generated label predictions into a second neural network, wherein the second neural network is trained to classify shopping carts and/or order confirmation pages based on the machine-generated label predictions;
identifying order-related data on the webpage from the machine-generated label predictions for the HTML tags and the corresponding tag values; and
outputting the identified order-related data, wherein the order-related data is outputted in the form of key-value pairs comprising: (1) the machine-generated label predictions for the HTML tags, and (2) the values associated with the HTML tags.

16. The non-transitory computer-readable medium of claim 15, wherein identifying the order-related data comprises identifying a shopping cart on the webpage using the machine-generated label predictions.

17. A computer system for identifying order-related data on a webpage using machine learning, the system comprising:
one or more processors;
one or more memory units coupled to the one or more processors, wherein the one or more memory units store instructions that, when executed by the one or more processors, cause the system to perform the operations of:
identifying one or more HTML blocks on a webpage for further processing, wherein each HTML block preserves an original HTML structure including parent-child and sibling relationships and includes one or more HTML tags that are each associated with metadata and a value, wherein, for each HTML tag, the metadata comprises a tag ID, tag name, tag class, tag type, and inner text for the HTML tag, and the value is a value that corresponds to the HTML tag;
converting each of the HTML tags into a vector representation, wherein converting each of the HTML tags into a vector representation comprises:
concatenating the metadata and the inner text of the HTML tag to form a string with a plurality of words,
for each word in the string, retrieving a word embedding in a pretrained word2vec model, and
creating a sentence embedding from the word embeddings;
applying a deep neural network model to each of the vector representations, resulting in another vector representation, which is converted into a machine-generated label prediction for each tag, wherein the deep neural network model is a bi-directional long short-term memory neural network that is trained to predict labels, including order-related labels, corresponding to HTML tags, and wherein the machine-generated label prediction for each tag is outputted with a confidence score;
inputting the machine-generated label predictions into a second neural network, wherein the second neural network is trained to classify shopping carts and/or order confirmation pages based on the machine-generated label predictions;
identifying order-related data on the webpage from the machine-generated label predictions for the HTML tags and the corresponding tag values; and outputting the identified order-related data, wherein the order-related data is outputted in the form of key-value pairs comprising: (1) the machine-generated label predictions for the HTML tags, and (2) the values associated with the HTML tags.

18. The system of claim 17, wherein identifying the order-related data comprises identifying a shopping cart on the webpage using the machine-generated label predictions.

* * * * *